May 22, 1956      J. C. KING      2,746,815
FOLLOWER BLOCK CONSTRUCTION
Filed Dec. 16, 1953
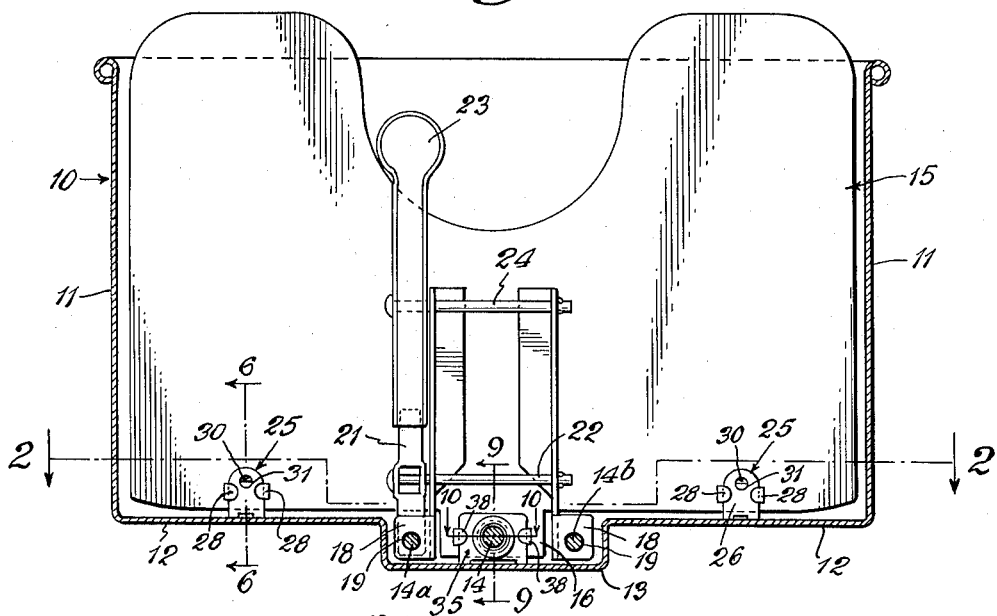
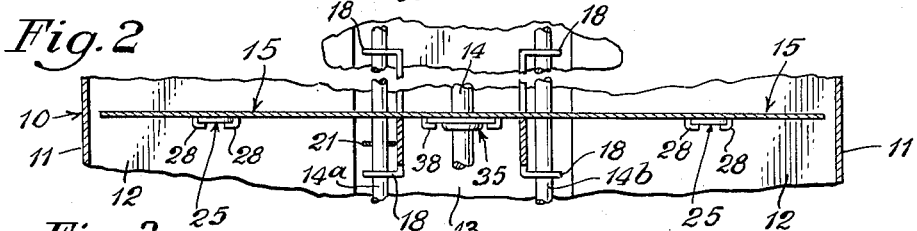
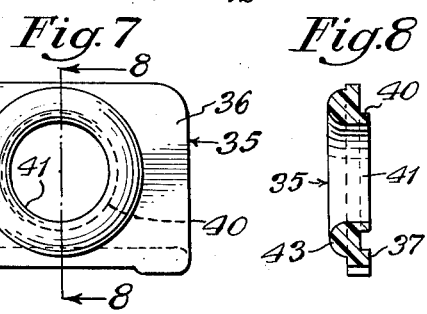
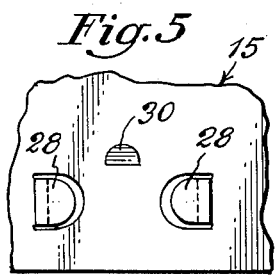
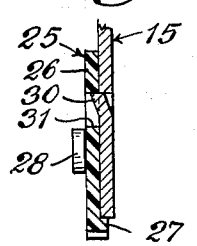
Inventor
Jack C. King
by Parker & Carter
Attorneys United States Patent Office 2,746,815
Patented May 22, 1956

2,746,815

FOLLOWER BLOCK CONSTRUCTION

Jack C. King, North Muskegon, Mich., assignor to The Shaw-Walker Company, Muskegon, Mich., a corporation of Michigan Application December 16, 1953, Serial No. 398,493

5 Claims. (Cl. 308—4)

This invention relates to improvements in anti-friction means for upright partitions, such as follower plates used in filing cabinet drawers, although not limited to such devices.

The principal object of the invention is to provide a simple and inexpensive form of antifriction bearing pieces adapted for insertion in suitable retaining members along the edge of the movable partition so that said partition may be slidable along the drawer or the like with greater smoothness and less noise than heretofore in devices of the character mentioned.

A further object of the invention is to provide an antifriction bearing piece made of a generally flat block of molded plastic material having means for readily snapping said piece into self-locking relation with the retaining members on the partition so as to resist accidental displacement of the bearing piece while in use.

Other objects and advantages of the invention will appear from time to time as the following description proceeds.

The invention may best be understood by reference to the accompanying drawings, in which:

Figure 1 is a vertical transverse section of a filing cabinet drawer having an upright follower plate therein provided with a plurality of antifriction bearing pieces secured to the bottom edge thereof in accordance with my invention;

Figure 2 is a section taken on line 2—2 of Figure 1;

Figure 3 is an enlarged face view of one form of antifriction bearing piece used near each side of the follower plate of Figure 1;

Figure 4 is a section taken on line 4—4 of Figure 3;

Figure 5 is an enlarged face view of a fragmentary portion of the lower edge of the follower plate showing details of the retaining means for the form of bearing piece shown in Figures 3 and 4;

Figure 6 is an enlarged section taken on line 6—6 of Figure 1;

Figure 7 is an enlarged face view of another form of antifriction bearing piece especially adapted for use at the center of the follower plate, and including a bearing aperture for a retaining rod;

Figure 8 is a section taken on line 8—8 of Figure 7;

Figure 9 is an enlarged detail section taken on line 9—9 of Figure 1;

Figure 10 is an enlarged detail section taken on line 10—10 of Figure 1.

Referring now to details of the embodiment of my invention shown in the drawings, Figure 1 shows a drawer 10 formed of sheet metal of the kind adapted for use in a filing cabinet, said drawer including side walls 11, 11 and a bottom wall consisting of floor portions 12, 12 and a downwardly offset portion forming an elongated channel 13 extending the length of the drawer bottom in a manner common with filing cabinet drawers of the character mentioned. A central retaining rod 14 and two spaced parallel retaining rods 14a, 14b extend longitudinally of the channel portion 13 below the level of the floor portions 12, 12 for retaining a follower plate or partition, indicated generally at 15.

In the form shown herein, the follower plate or partition 15 is of generally conventional form consisting of a flat body made of sheet metal and including a depending central portion 16 adapted for sliding movement along the guide rods 14, 14a and 14b and within the central channel portion 13 of the drawer. The depending portion 16 has an aperture therethrough, indicated generally at 17, for the central guide rod 14. Said depending portion 16 also has two pairs of L-shaped guide supports 18, 18 projecting from the front and rear faces thereof, each having apertures 19, 19 slidably engaged with the outermost pair of guide rods 14a and 14b on opposite sides of the central guide rod 14, so as to resist fore and aft tilting movement of the follower plate in the usual manner.

The follower plate may also be provided with holding means, such as a conventional clamping lever 21, the lower end of which has an aperture slidably fitting on one of the guide rods 14a. Said lever is pivotally mounted on a cross pin 22 and is provided with spring-pressed means (not shown) normally urging the apertured end of said lever into tilting engagement with the last-named guide rod so as to maintain the follower plate temporarily in any desired position along the drawer. The upper end of the clamping lever 21 is releasable by a hand lever 23 pivoted on a second cross pin 24, as shown in Figure 1. Further details of the holding means need not be shown or described herein as it forms no essential part of the present invention.

Referring now to the antifriction bearing insert means which forms the principal feature of the present invention, the form of insert employed near opposite sides of the follower plate 15 consists in a pair of blocks 25, 25 shown in detail in Figures 3 and 4.

Each of said blocks 25 consists of a semi-rigid piece of molded plastic material, preferably of nylon, which affords especially effective antifriction, noiseless, sliding properties for the purposes of the present invention. Said block has a substantially flat, parallel-sided body 26 with an L-shaped flange 27 along its bottom edge, with its upper shoulder adapted to have seating engagement on the bottom edge of the follower plate 15. The bottom edge of flange 27 forms the bearing face or skid for sliding engagement with the adjacent drawer bottom 12. The follower plate 15 has a pair of opposed retaining ears 28, 28 on one face thereof, spaced from the bottom edge, as herein shown said ears being formed integrally with said plate by slitting and offsetting the slit portions from the body of said plate, as by stamping, into the L-shaped form shown in Figures 5 and 6. Said ears are so arranged as to retain the side edges of the block 25 under tension when the latter is inserted endwise therebetween.

The follower plate 15 also has an integral tongue 30 formed as by slitting and stamping the same from the body of said plate, so as to project outwardly at an inclined angle from the adjacent face, for engagement with a suitable abutment in the opposed face of the block 25. In the form shown herein, said abutment consists of the upper edge of a round aperture 31, the terminal edge of the tongue 30 being rounded to fit under holding tension against said upper edge of said aperture when the lower flange 27 is in seated engagement with the bottom edge of the follower plate, as shown in Figure 6.

A somewhat different form of molded plastic antifriction bearing block or insert 35 is employed on the central depending portion 16 of the follower plate, which block not only acts as a bearing skid in a manner similar to the blocks 25, 25 previously described, but also affords antifriction bearing engagement with the center guide rod 14 where the latter passes through said depending portion 16. The center block 35 has a substantially flat parallel-sided body 36, with an L-shaped flange 37 along its bottom edge, adapted to be seated along the bottom edge of the follower plate in the same manner as the blocks 25, with the side edges of the block retained under tension beneath ears 38, 38 on the follower plate. In the case of the center block 35 however, the latter is formed with a central aperture 41 of such size as to permit the center guide rod 14 to pass therethrough with proper sliding clearance. An annular flange 40 surrounds the aperture 41 on the inner face of the block of such diameter as to fit snugly within aperture 17 formed in the depending portion 16 of the follower plate. In addition, an annular bead 43 may also be formed on the outer face of the block 35 surrounding the aperture 41, said bead being rounded in cross section, as shown in Figure 8.

The use and operation is as follows:

The bearing blocks 25, 25 near the outer sides of the follower plate can be readily slipped into seated engagement relative to the follower plate by inserting their side edges between the retaining ears 28, 28. Since the body 26 of each block is made of a semi-rigid plastic material as described, it will yield under tension sufficiently to permit engagement of the locking tongue 30 on the follower plate with the abutment surface formed by the upper edge of the aperture 31 in said block, when the upper shoulder of flange 27 is in seated engagement with the bottom edge of the follower plate. Thus, when the block is in the fully seated position shown in Figures 1 and 6, it will be retained against accidental endwise displacement by interlocking retaining means including the opposed abutment surface provided by aperture 31 and the lower flange 27 on the block.

The center bearing block 35 can also be readily slipped into its seated engagement relative to the follower plate in substantially the same manner, so as to be retained against accidental displacement, excepting that the upper part of the opposed abutment means on block 35 consists of the annular flange 40, fitting snugly in the aperture 17 of the follower plate, and surrounding aperture 41 affording added antifriction bearing engagement with the center guide rod 14 which passes therebetween.

Although I have shown and described certain embodiments of my invention, it will be understood that I do not wish to be limited to the exact constructions shown and described, but that various changes and modifications may be made without departing from the spirit and scope of the invention as defined in the appended claims.

I claim:

1. In combination with a generally upright partition adapted for sliding movement on an elongated support, a bearing piece comprising a generally flat semi-rigid block of molded plastic material having an offset rib along the bottom edge thereof, said partition having a pair of opposed flange members offset from one face and adjacent one edge thereof, for retaining opposed side edges of said bearing piece, and mutually interfitting abutment means on said block and the upright face of said partition, respectively, for holding said block against displacement when the side edges and rib of said block are in seated relation respectively with the flanges and the adjacent edge of said partition.

2. The structure of claim 1, wherein the block has an aperture extending therethrough for slidable engagement along a guide rod, the abutment means on the block comprises a flange surrounding the aperture in said block and projecting from the same face of the latter as the rib, and the partition has an aperture therethrough for receiving the flange on the block in interfitting engagement therein.

3. The structure of claim 2, wherein the partition consists of sheet metal and the offset flanges are formed integrally with the partition.

4. An anti-friction bearing piece for an upright partition comprising a generally flat elongated block of semi-rigid plastic material having parallel side edges adapted for endwise insertion between laterally opposed retaining members on the partition, said block having an offset rib along its lower edge adapted for seating engagement along the lower edge of the partition, said rib also forming the anti-friction bearing surface for said offset block and said block also having a shouldered recess in its face spaced vertically from said rib and on the same side as the latter, said shouldered recess being adapted for interfitting engagement with the registering abutment means on the partition to hold said block against displacement when the side edges of said block are in seated relation with the retaining members on the partition and the rib is in seating engagement along the lower edge of the partition.

5. The anti-friction bearing piece in accordance with claim 4, wherein the shouldered recess in the block consists of a flanged aperture extending through said block, adapted for slidable engagement along a guide rod, the flange of said aperture being adapted for interfitting engagement with a registering aperture in the partition.

References Cited in the file of this patent

UNITED STATES PATENTS

| | | |
|---|---|---|
| 1,121,151 | Ulrich | Dec. 15, 1914 |
| 1,438,385 | Lehman | Dec. 12, 1922 |
| 1,489,804 | Vlissingen | Apr. 8, 1924 |
| 1,666,700 | Harrison | Apr. 17, 1928 |
| 2,312,742 | Andersen | Mar. 2, 1943 |
| 2,606,091 | Buchy et al. | Aug. 5, 1952 |